UNITED STATES PATENT OFFICE.

LEONARD S. BEALS, OF LONG ISLAND CITY, NEW YORK, ASSIGNOR TO THE CEROXYLON COMPANY, OF SAME PLACE.

PREPARING PYROXYLINE.

SPECIFICATION forming part of Letters Patent No. 239,425, dated March 29, 1881.

Application filed October 5, 1880. (No specimens.)

*To all whom it may concern:*

Be it known that I, LEONARD S. BEALS, a citizen of the United States, residing at Long Island City, in the county of Queens and State of New York, have invented certain new and useful Improvements in Preparing Pyroxyline; and I do hereby declare the following to be a full, clear, and exact description of the invention, such as will enable others skilled in the art to which it appertains to make and use the same.

This invention relates to the treatment of pyroxyline, xyloidine, nitro-cellulose, or that substance derived from ligneous or vegetable fibers, starch, or sugar which has been treated with suitable acids, and is known as "soluble pyroxyline."

The invention consists in the use of vegetable wax in bringing the soluble pyroxyline to a plastic condition. Heretofore camphor has been preferably used for this purpose; but there is great liability to shrinkage and warping, owing to the evaporation of the camphor. Various materials have been tried to overcome this difficulty with more or less success; but nothing yet has been found to fully supplant camphor, notwithstanding the difficulty attending its use, before referred to. In the course of a series of experiments on this subject, I have found that vegetable wax has proved to be very useful for this purpose, and will, I believe, prove very valuable, as it fully avoids the trouble caused by shrinkage and warping.

In carrying out my invention, I dissolve the pyroxyline in any convenient way, but preferably by the use of a compound of mirbane, essential oil of lavender, benzole, and either methylic or ordinary alcohol, or both. I have found the proportions set forth in the following recipes to produce the best effects: first, five parts mirbane, five parts essential oil of lavender, fifty-five parts benzole, thirty-five parts methylic alcohol—total, one hundred parts; second, five parts mirbane, five parts essential oil of lavender, fifty-five parts benzole, thirty-five parts alcohol—total, one hundred parts; third, five parts mirbane, five parts essential oil of lavender, thirty parts benzole, thirty parts methylic alcohol, thirty parts alcohol—total, one hundred parts. Either of the above compounds will be found to be a superior solvent of soluble pyroxyline, or a mixture of two or more thereof may be used with advantage; or the proportion of the ingredients may be varied according to the use to which the softened or dissolved pyroxyline is to be afterward applied.

In using these compounds I take of soluble pyroxyline one hundred parts and add thereto about two hundred parts of either of the above-named solvents alone, or of two or more thereof combined, or sufficient of them to dissolve or soften the pyroxyline into a pasty mass. The solution may be effected when the materials are cold; but to hasten the solution a moderate degree of heat may be applied—say 150° or 200° Fahrenheit—with advantage. One hundred parts of the pasty mass thus formed should be mixed with about ten parts of vegetable wax, which may either be dissolved in alcoholic or naphtha solvents before adding to the pyroxyline compound; but such solution is not important. If preferred, a portion of the vegetable wax may be omitted and olibanum frankincense or paraffine substituted therefor. The whole should then be intimately mixed, with or without the incorporation of pigments or other material, by any mechanical means, (grinding between heated rollers preferred,) as is well understood by persons conversant with the art, in order to thoroughly incorporate all the mixture and evaporate the solvents.

The above proportion is found to be useful; but I do not confine myself to the exact quantities, as the ingredients may be varied to suit the objects to which the plastic compound is to be afterward applied.

By the use of the above-described compound solvents, in about the proportions specified, and the further use of vegetable wax, either with or without the addition of paraffine or olibanum frankincense, the preparation of the pyroxyline is greatly facilitated, and the shrinkage and warping caused by the use of camphor avoided.

I make no claim in this application to the use of paraffine or olibanum frankincense independent of the vegetable wax, as I have made separate applications for the use of these substances.

I am aware that ordinary wax and paraffine have heretofore been used; but these are not equivalents for the vegetable wax, as the latter has a lower fusion-point, and has more freedom from saccharine and greasy matter. It is more mobile under the influence of heat than animal wax or paraffine, and gives a greater degree of plasticity to the pyroxyline compound.

What I claim as new is—

1. The process herein described of treating pyroxyline and similar substances, consisting in mixing with the same vegetable wax, either with or without the addition of paraffine, substantially as specified.

2. The process herein described of treating pyroxyline and similar substances, consisting in dissolving the same in a compound of mirbane, oil of lavender, benzole, and alcohol, and then adding vegetable wax, either with or without paraffine, substantially as specified.

In testimony whereof I affix my signature in presence of two witnesses.

LEONARD S. BEALS.

Witnesses:
DANIEL P. MAHONY,
EDGAR J. NATHAN.